(12) United States Patent
Talary et al.

(10) Patent No.: US 12,518,028 B2
(45) Date of Patent: Jan. 6, 2026

(54) DATA FILES EMBEDDING STEGANOGRAPHIC REPEATS OF PALINDROMIC FINGERPRINTS FOR AUTHORSHIP PROTECTION

(71) Applicant: Christoph Staub, Unterägeri (CH)

(72) Inventors: Mark Stuart Talary, Zürich (CH); Philipp Keller, Zürich (CH)

(73) Assignee: Christoph Staub, Unterägeri (CH)

( * ) Notice: Subject to any disclaimer, the term of this patent is extended or adjusted under 35 U.S.C. 154(b) by 84 days.

(21) Appl. No.: 18/700,646

(22) PCT Filed: Oct. 12, 2021

(86) PCT No.: PCT/EP2021/078199
§ 371 (c)(1),
(2) Date: Apr. 11, 2024

(87) PCT Pub. No.: WO2023/061563
PCT Pub. Date: Apr. 20, 2023

(65) Prior Publication Data
US 2024/0419814 A1    Dec. 19, 2024

(51) Int. Cl.
*G06F 21/60* (2013.01)
(52) U.S. Cl.
CPC .................. *G06F 21/602* (2013.01)
(58) Field of Classification Search
CPC ....... G06F 21/602; G09C 1/00; H04L 9/3247; H04L 2209/608; G06T 2201/0051; G06T 2201/0065; G06T 1/005
See application file for complete search history.

(56) References Cited

U.S. PATENT DOCUMENTS

| | | |
|---|---|---|
| 2003/0026447 A1 | 2/2003 | Fridrich et al. |
| 2007/0033409 A1 | 2/2007 | Brunk et al. |
| 2020/0065526 A1* | 2/2020 | Berman ................ G06T 1/0028 |

OTHER PUBLICATIONS

Khalifa, Amal, Ahmed Elhadad, and Safwat Hamad. "Secure blind data hiding into pseudo DNA sequences using playfair ciphering and generic complementary substitution." Appl. Math. Inf. Sci 10.4 (2016): 1483-1492 (Year: 2016).*

(Continued)

*Primary Examiner* — Sangseok Park
(74) *Attorney, Agent, or Firm* — Mannava & Kang, P.C.

(57) ABSTRACT

The invention is notably directed to a computer-implemented method of processing a data file, wherein the method comprises: accessing (S10) a data file (F1) containing binary data that represent analogue data, to populate (S20) a first data structure (11) with the binary data; obtaining (S30) a second data structure (12) by replacing, in the first data structure (11), data (111) corresponding to some of least significant bits of the binary data with substitutive bit values (121); obtaining (S40) a digital fingerprint of the second data structure (12); forming (S50) a binary representation of a payload that includes repeats of a sequence, the sequence containing a palindrome based on the digital fingerprint; obtaining (S60) a third data structure (13) by embedding the binary representation of the payload (131, 132) formed in the second data structure (12), in place of the substitutive bit values (121); and storing (S70) a modified data file (F1*m*) including binary data of the third data structure (13). The invention is further directed to related detection methods, data files, computerized systems, and computer program products.

20 Claims, 9 Drawing Sheets

(56) References Cited

OTHER PUBLICATIONS

International Search Report and Written Opinion for PCT Application No. PCT/EP2021/078199, mailed Jun. 14, 2022, 12 pages.

* cited by examiner

| 1 | 0 | 1 | 1 | 0 | 1 | 1 | 0 | 0 | 0 | 0 |
|---|---|---|---|---|---|---|---|---|---|---|
| 1 | 0 | 1 | 1 | 0 | 1 | 1 | 1 | 0 | 1 | 0 | 0 |
| 0 | 1 | 1 | 1 | 0 | 0 | 0 | 0 | 0 | 0 | 0 |
| 0 | 1 | 0 | 1 | 1 | 1 | 0 | 0 | 0 | 1 | 0 | 1 |
| 0 | 0 | 0 | 0 | 1 | 1 | 0 | 0 | 0 | 1 | 0 | 0 |
| 1 | 0 | 0 | 1 | 0 | 0 | 1 | 0 | 1 | 0 | 0 | 1 |
| 1 | 1 | 0 | 0 | 1 | 1 | 1 | 1 | 0 | 0 | 0 | 0 |
| 0 | 1 | 1 | 1 | 0 | 1 | 0 | 1 | 1 | 0 | 0 | 1 |
| 1 | 0 | 0 | 1 | 1 | 0 | 0 | 1 | 1 | 0 | 1 | 0 |
| 0 | 1 | 1 | 1 | 1 | 1 | 1 | 1 | 1 | 0 | 0 |

| 0 | 1 | 1 | 1 | 0 | 1 | 1 | 1 | 0 | 1 | 1 | 1 |

FIG. 2A

| 1 | 0 | 1 | 1 | 0 | 1 | 1 | 0 | 0 | 0 | 0 |
|---|---|---|---|---|---|---|---|---|---|---|
| 1 | 0 | 1 | 1 | 0 | 1 | 1 | 1 | 0 | 1 | 0 | 0 |
| 0 | 1 | 1 | 1 | 0 | 0 | 0 | 0 | 0 | 0 | 0 |
| 0 | 1 | 0 | 1 | 1 | 1 | 0 | 0 | 0 | 1 | 0 | 1 |
| 0 | 0 | 0 | 0 | 1 | 1 | 0 | 0 | 0 | 1 | 0 | 0 |
| 1 | 0 | 0 | 1 | 0 | 0 | 1 | 0 | 1 | 0 | 0 | 1 |
| 1 | 1 | 0 | 0 | 1 | 1 | 1 | 1 | 0 | 0 | 0 | 0 |
| 0 | 1 | 1 | 1 | 0 | 1 | 0 | 1 | 1 | 0 | 0 | 1 |
| 1 | 0 | 0 | 1 | 1 | 0 | 0 | 1 | 1 | 0 | 1 | 0 |
| 0 | 1 | 1 | 1 | 1 | 1 | 1 | 1 | 1 | 0 | 0 |

| 0 | 0 | 0 | 0 | 0 | 0 | 0 | 0 | 0 | 0 | 0 | 0 |

FIG. 2B

| | | | | | | | | | | | |
|---|---|---|---|---|---|---|---|---|---|---|---|
| 1 | 0 | 1 | 1 | 0 | 1 | 1 | 0 | 0 | 0 | 0 | 0 |
| 1 | 0 | 1 | 1 | 0 | 1 | 1 | 1 | 0 | 1 | 0 | 0 |
| 0 | 1 | 1 | 1 | 0 | 0 | 0 | 0 | 0 | 0 | 0 | 0 |
| 0 | 1 | 0 | 1 | 1 | 1 | 0 | 0 | 0 | 1 | 0 | 1 |
| 0 | 0 | 0 | 0 | 1 | 1 | 0 | 0 | 0 | 1 | 0 | 0 |
| 1 | 0 | 0 | 1 | 0 | 0 | 1 | 0 | 1 | 0 | 0 | 1 |
| 1 | 1 | 0 | 0 | 1 | 1 | 1 | 1 | 0 | 0 | 0 | 0 |
| 0 | 1 | 1 | 1 | 0 | 1 | 0 | 1 | 1 | 0 | 0 | 1 |
| 1 | 0 | 0 | 1 | 1 | 0 | 0 | 1 | 1 | 0 | 1 | 0 |
| 0 | 1 | 1 | 1 | 1 | 1 | 1 | 1 | 1 | 1 | 0 | 0 |
| 0 | 0 | 0 | 0 | 0 | 0 | 0 | 0 | 0 | 0 | 0 | 0 |
| 0 | 0 | 0 | 0 | 0 | 0 | 1 | 1 | 0 | 0 | 1 | 0 |
| 1 | 0 | 0 | 0 | 1 | 1 | 0 | 1 | 1 | 1 | 0 | 0 |
| 1 | 1 | 0 | 0 | 0 | 0 | 1 | 1 | 1 | 1 | 1 | 1 |
| 0 | 0 | 0 | 1 | 1 | 0 | 1 | 0 | 1 | 0 | 0 | 0 |
| 0 | 1 | 0 | 0 | 1 | 0 | 1 | 1 | 0 | 0 | 1 | 0 |
| 1 | 0 | 1 | 0 | 0 | 1 | 1 | 1 | 1 | 1 | 0 | 1 |
| 1 | 1 | 0 | 0 | 1 | 0 | 1 | 1 | 1 | 0 | 1 | 1 |
| 0 | 1 | 0 | 1 | 0 | 1 | 0 | 1 | 1 | 0 | 0 | 1 |
| 1 | 1 | 1 | 0 | 0 | 0 | 1 | 0 | 1 | 1 | 1 | 1 |
| 1 | 1 | 0 | 1 | 1 | 0 | 0 | 1 | 0 | 1 | 1 | 0 |
| 0 | 0 | 0 | 0 | 0 | 0 | 0 | 0 | 0 | 0 | 0 | 0 |
| 1 | 0 | 0 | 0 | 1 | 0 | 1 | 1 | 1 | 0 | 1 | 0 |
| 0 | 1 | 0 | 0 | 1 | 0 | 1 | 0 | 0 | 1 | 0 | 1 |
| 0 | 1 | 1 | 0 | 1 | 1 | 0 | 1 | 1 | 1 | 0 | 0 |
| 1 | 1 | 0 | 0 | 1 | 1 | 0 | 1 | 1 | 0 | 0 | 1 |
| 0 | 0 | 1 | 1 | 0 | 0 | 0 | 0 | 1 | 0 | 1 | 0 |
| 1 | 1 | 0 | 0 | 0 | 0 | 0 | 0 | 1 | 0 | 0 | 1 |
| 1 | 1 | 0 | 1 | 0 | 0 | 1 | 1 | 0 | 1 | 0 | 0 |
| 0 | 0 | 0 | 1 | 0 | 1 | 1 | 0 | 0 | 0 | 1 | 1 |
| 1 | 1 | 1 | 0 | 1 | 1 | 1 | 0 | 1 | 0 | 1 | 0 |
| 1 | 0 | 1 | 0 | 0 | 1 | 0 | 0 | 0 | 0 | 1 | 1 |
| 0 | 0 | 0 | 0 | 0 | 0 | 0 | 0 | 0 | 0 | 0 | 0 |

FIG. 3A

```
S110: Access further data file containing binary data
that represents analogue data
```
↓
```
S120: Scan data file to detect palindrome embedded
in binary data
```

```
S130: Scan data file header(s)/metadata
to extract palindrome and other data
```
↓
```
S140: Compare palindromes detected with reference
palindrome stored in database to identify match
```
↓
```
S145: Perform diagnostic based on detected data
```
↓
```
S150: Extract signature from palindrome
```
↓
```
S160: Verify signature with associated public key
```

FIG. 4C

DATA FILES EMBEDDING STEGANOGRAPHIC REPEATS OF PALINDROMIC FINGERPRINTS FOR AUTHORSHIP PROTECTION

CLAIM FOR PRIORITY

The present application is a national stage filing under 35 U.S.C 371 of PCT application number PCT/EP2021/078199, having an international filing date of Oct. 12, 2021, the disclosure of which is hereby incorporated by reference in its entirety.

BACKGROUND

The invention relates in general to authorship protection and verification of digital files and notably to computer-implemented, steganographic techniques (i.e., methods, systems, and computer program products), in which digital fingerprints are embedded in the data files. In particular, it is directed to methods embedding palindromic representations of digital fingerprints of the files, in place of least significant bits of binary data of the files, where such binary data represent analogue data.

Digital steganography concerns techniques of concealing information within data, whereby a message, a file, an image, or any type of data, is concealed within another message, file, etc. Because of their large sizes, media files are ideal candidates for steganographic embeddings. A typical steganographic process consists in altering selected data, e.g., corresponding to a subset of pixel values of an image. This is often achieved by replacing the least significant bits of an image with bits encoding the concealed message. The resulting changes are so subtle that they are unlikely to be detected by people or automated processes that do not specifically seek them out. More generally, an advantage of steganographic processes is that the concealed information is embedded in such a manner that it does not attract attention, as opposed to encrypted messages.

Steganographic techniques are notably used for authorship protection and copy detection of digital files such as media files. However, the techniques currently in use offer limited resilience to modifications and transformations of the original files by third parties (including plagiarists), hence the need for improvement.

SUMMARY

According to a first aspect, the present invention is embodied as a computer-implemented method of processing a data file. The method first comprises accessing a data file containing binary data that represent analogue data, such as binary data encoding pixel values of an image. A first data structure is populated with the binary data of the accessed file. A second data structure is then obtained by replacing, in the first data structure, data corresponding to some of least significant bits of the binary data with substitutive bit values, i.e., dummy bit values. A digital fingerprint of the second data structure is subsequently obtained. This digital fingerprint may for instance be obtained by hashing data obtained from the second data structure, preferably by cryptographically signing such data. Next, a binary representation of a payload is formed, where the payload includes repeats of a sequence, i.e., a repeated pattern.

The sequence contains a palindrome that is based on the digital fingerprint. That is, the palindrome is formed according to the fingerprint. A third data structure is then obtained by embedding the binary representation of the payload in the second data structure, in place of the substitutive bit values. Eventually, the method stores a modified data file, which includes binary data of the third data structure.

Thanks to the present approach, the presence of the embedded digital fingerprint can more easily be detected (e.g., for authorship/inventorship detection and protection purposes) by scanning data files. Because palindromic repeats are embedded, the rows can be scanned in several directions. Thus, the digital fingerprint can be detected even if the file is subject to vertical and/or horizontal transformations. In other words, the proposed approach increases the detectability of the data file, even if this file is altered.

The sequence in the payload includes an asymmetric delimiter, in addition to the palindrome. That is, the asymmetric delimiter is adjoined to the palindrome in the sequence. The delimiter can be used as a flow detection header, upon verifying data files. The header eases the detection of the palindrome and, all the more, makes it possible to easily determine whether a file was altered (i.e., flipped and/or mirrored), and, if so, how it was altered.

In preferred embodiments, the binary representation of the payload is embedded by orthogonally interspersing the binary representation in the second data structure, in place of the substitutive bit values. In detail, each of the data structures involved (i.e., the first, the second, and the third data structures) can be represented as a 2D matrix of binary data, where the 2D matrix includes columns and rows. The substitutive bit values form part of only a subset of the rows of the second data structure. I.e., a subset of the rows of the second data structure include the substitutive bit values. Thus, the binary representation of the payload can be embedded by orthogonally interspersing the binary representation through said subset of the rows. In other words, columns and rows formed from the binary representation payload are interwoven in rows of this subset. As a result, two consecutive bit values in each row of this subset correspond to an element of an embedded column of the binary representation of the payload and an element of an embedded row of the binary representation of the payload.

The orthogonal interspersing makes it easier to detect potential correspondences between files, even if some of these files are horizontally mirrored and/or vertically flipped. In addition, when used together with asymmetric delimiters, the orthogonal interspersing makes it possible to diagnose whether a matching file was flipped and or mirrored.

The first data structure is preferably dimensioned according to an expected bit length of the sequence. In particular, the length of each of the rows of the first data structure may correspond to twice the expected bit length of the sequence, to accommodate the orthogonal interspersing of the binary representation of the payload.

Preferably, the binary representation of the payload if formed by encoding the sequence in a number of bits that differs from the number of bits as initially used to encode the binary data. That is, the binary data contained in the accessed data file may be encoded in a first number of bits (e.g., it is encoded in byte-length values), while the sequence is encoded in a second number of bits, where the second number differs from the first number (e.g., encoded off-byte). This further obfuscates the embedded information. In particular, repeated patterns like the delimiters between the palindromes are less likely to be detected when encoded according to a different encoding scheme. To that aim, the method may optionally access a parameter as to the second number of bits (prior to encoding the sequence) and accordingly set the second number of bits, prior to encoding the sequence. This parameter may for instance be automatically set, based on, e.g., the type of files.

The present methods may advantageously be performed, at least in part, by running an algorithm on a user computer, e.g., on a web browser of the user computer. This way, the data files safely stays with the users, although they can remotely be verified, thanks to digital fingerprints thereof.

In preferred embodiments, the method further comprises adding the palindrome in each of one or more headers of the modified data file, which makes it possible to subsequently exploit redundancy upon verifying data files. The palindrome may notably be added in an author section of a metadata header, a comment section of the metadata header, and/or data block headers.

In some cases, the binary data contained in the data file accessed may not represent any analogue data. In such cases, the method may first seek to open the initial data file and then add an image to it, so as to obtain a data file, which contains binary data that represent analogue data corresponding to the added image. The binary data corresponding to the added image is then suitably identified as such, with a view to obtaining the data structures and embedding the binary representation of the payload.

In preferred embodiments, the accessed data files are systematically scanned for images, with a view to embedding the binary representation of the payload in corresponding binary values. E.g., accessing a data file comprises opening the data file, detecting an image included therein, and identifying the binary data contained therein, which correspond to the detected image.

In embodiments, the digital fingerprint is obtained as part of cryptographically signing data obtained from the second data structure, using a private cryptographic key (e.g., as stored on the user's side). In that case, the method may further comprise verifying the digital fingerprint (i.e., a signature) corresponding to the detected palindrome, thanks to a public key corresponding to this private key.

The methods described above may advantageously be completed by verification steps, which exploit payloads embedded in the data files. For instance, the method may further comprise: accessing a further data file containing binary data that represents analogue data; scanning through a certain representation (e.g., as a 2D matrix) of the binary data of the further data file to detect the sequence as part of the payload, a binary representation of which is embedded in the binary data of the further data file accessed. The sequence contains said palindrome, such that the latter can be compared with a reference palindrome to identify a correspondence between said further data file and the modified data file.

In embodiments involving delimiters, the verification steps may further exploit such delimiters to determine whether a file was altered and, if so, how it was altered. That is, the payload may initially be formed so as for the sequence to include an initial asymmetric delimiter adjoined to the palindrome. Now, if the further data file has been altered (e.g., by flipping and/or mirroring the file), this alteration may give rise to an altered version of the initial asymmetric delimiter in the detected sequence. In this case, the method may further compare the altered version of this asymmetric delimiter with the initial asymmetric delimiter to determine a type of alteration of the further data file with respect to the modified data file.

Preferably, the verification steps further comprises extracting the palindrome from a header and/or metadata of the further data file accessed. This way, the various palindromes can be compared, i.e., as extracted from the detected sequence and from the header and/or metadata. This, in turn, makes it possible to improve diagnostics as to potential alterations of the files.

Another aspect of the invention concerns a method of verifying a correspondence between data files. To that aim, a data file is accessed, which contains binary data that represents analogue data. The verification method scans through a representation of the binary data of the accessed data file to detect a sequence in a binary representation of a payload embedded in the binary data of the accessed data file. According to the approach proposed herein, the payload includes repeats of the sequence, where the sequence contains a palindrome that is based on a digital fingerprint of a variant of the accessed data file. This variant contains substitutive bit values in place of the embedded payload. Eventually, the palindrome contained in the detected sequence is compared to a reference palindrome corresponding to a reference data file, so as to identify a correspondence between the accessed data file and the reference data file.

According to another aspect, the invention is embodied as a data file, e.g., as obtained according to the present embedding approach. That is, the data file comprises binary data that represent analogue data. It further contains a binary representation of a payload, binary values of which are embedded in the data file, in place of some least significant bits of the binary data. Consistently with the present approach, the payload includes repeats of a sequence, where the sequence contains a palindrome formed from a digital fingerprint. I.e., the palindrome is based on a digital fingerprint of a variant to said data file, where this variant contains substitutive bit values in place of the embedded payload.

According to a further aspect, the invention is embodied as a computer program product for processing a data file. The computer program product comprises a computer readable storage medium having program instructions embodied therewith. The program instructions are executable by processing means of a computerized system to cause the processing means to take steps according to any of the methods disclosed herein.

According to a final aspect, the invention is embodied as a computerized system. The computerized system comprises a main memory and processing means, the latter connected to the main memory. The computerized system is configured to load computerized methods (e.g., captured in the form of software) in the main memory, for the processing means to execute the loaded methods and thereby perform steps as described above, i.e., access a data file, populate a first data structure, obtain a second data structure by replacing some of least significant bits with substitutive bit values, obtain a digital fingerprint of the second data structure, form a binary representation of a payload (the latter including repeats of palindromes based on the digital fingerprint), embed this binary representation to obtain a third data structure, and instruct to store a modified data file including binary data of the third data structure.

In preferred embodiments, the computerized system may notably be configured to run a web browser via the processing means, whereby the computerized methods execute as part of the web browser run on the computerized system, in operation.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description.

In the drawings:

In FIG. 1A, the backend system is a central server, whereas it is a distributed computing system (e.g., configured as a blockchain) in FIG. 1B;

FIGS. 2A-3B are diagrams illustrating how data structures obtained from a given data file are gradually processed to orthogonally intersperse a payload in least significant bits of this data file, as in embodiments;

FIGS. 4A-4C are flowcharts illustrating high-level steps of methods of processing data files, to embed a payload (FIG. 4A), pre-process a data file (FIG. 4B), and verify correspondences between data files (FIG. 4C), according to embodiments. FIG. 4A;

The accompanying drawings show simplified representations of devices or parts thereof, as involved in embodiments. Similar or functionally similar elements in the figures have been allocated the same numeral references, unless otherwise indicated.

Computerized systems, methods, data files, and computer program products, embodying the present invention will now be described, by way of non-limiting examples.

DETAILED DESCRIPTION OF EMBODIMENTS OF THE INVENTION

The following description is structured as follows. General embodiments and high-level variants are described in section 1. Section 2 addresses more specific embodiments and technical implementation details.

1. General Embodiments and High-Level Variants

A first aspect of the invention is now described in detail. This aspect concerns a computer-implemented method of processing a data file. This method and its variants are collectively referred to as the "present methods" in this document. The present methods include methods to obtain tamperproof data files (as in FIG. 4A), as well as verification methods (as in FIG. 4C), which aim at detecting copies/variants of such data files. All references Sn refer to methods steps of the flowcharts of FIGS. 4A-4C, while numeral references pertain to data structures (FIGS. 2A-3B), data files, and physical parts or components of a computerized system 1-3 such as shown in FIGS. 1A and 1B.

The present methods are performed thanks to one or more algorithms running on such a computerized system. The computerized system 1-3 includes one or more computers 1-3. The latter may for instance include one or more user computers 1. The user computers 1 may be client computers 1 (or run client processes), which interact with a backend system 2, 3. Such a computerized system 1-3 concerns another aspect of the invention, which is described later in detail.

Figure 1A:
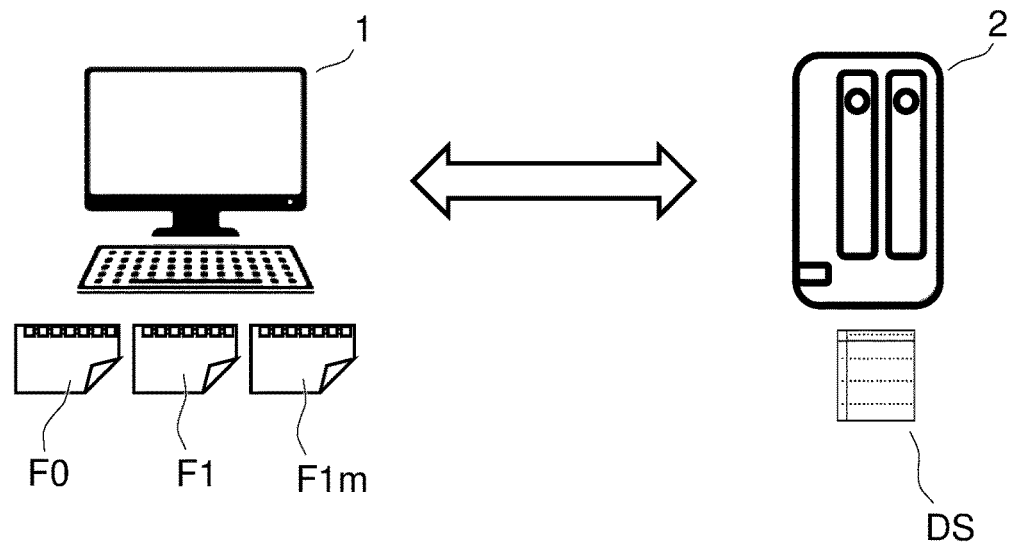
FIGS. 1A and 1B schematically represent a user computer interacting with a backend system to implement method steps as involved in embodiments of the invention.
Figure 1B:
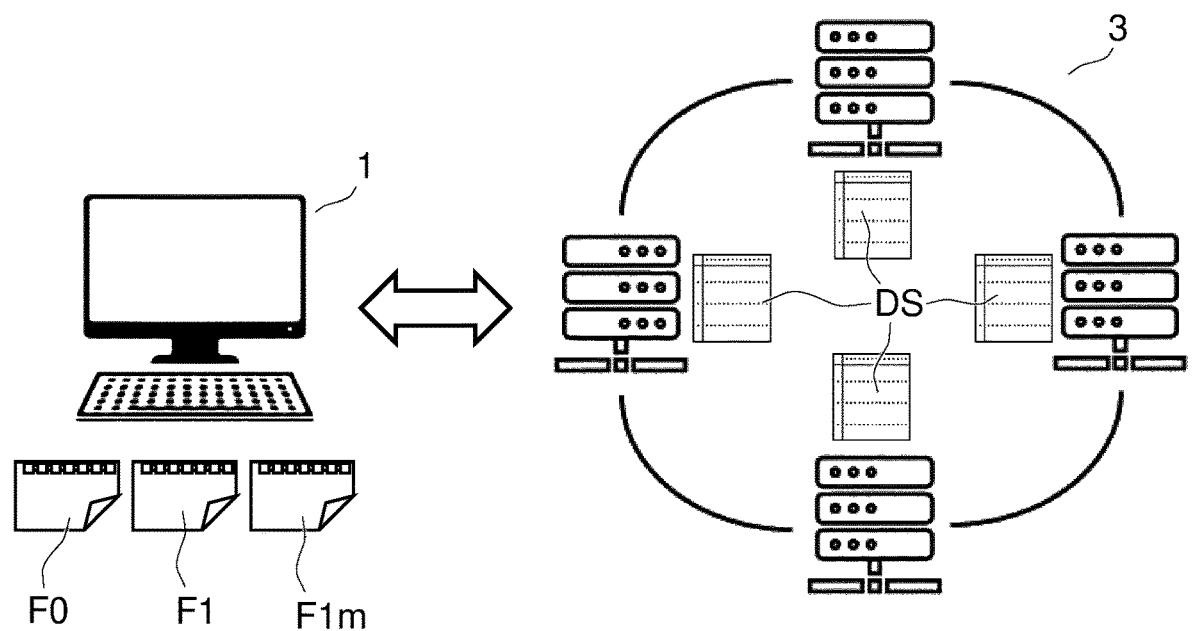
Figure 4A:
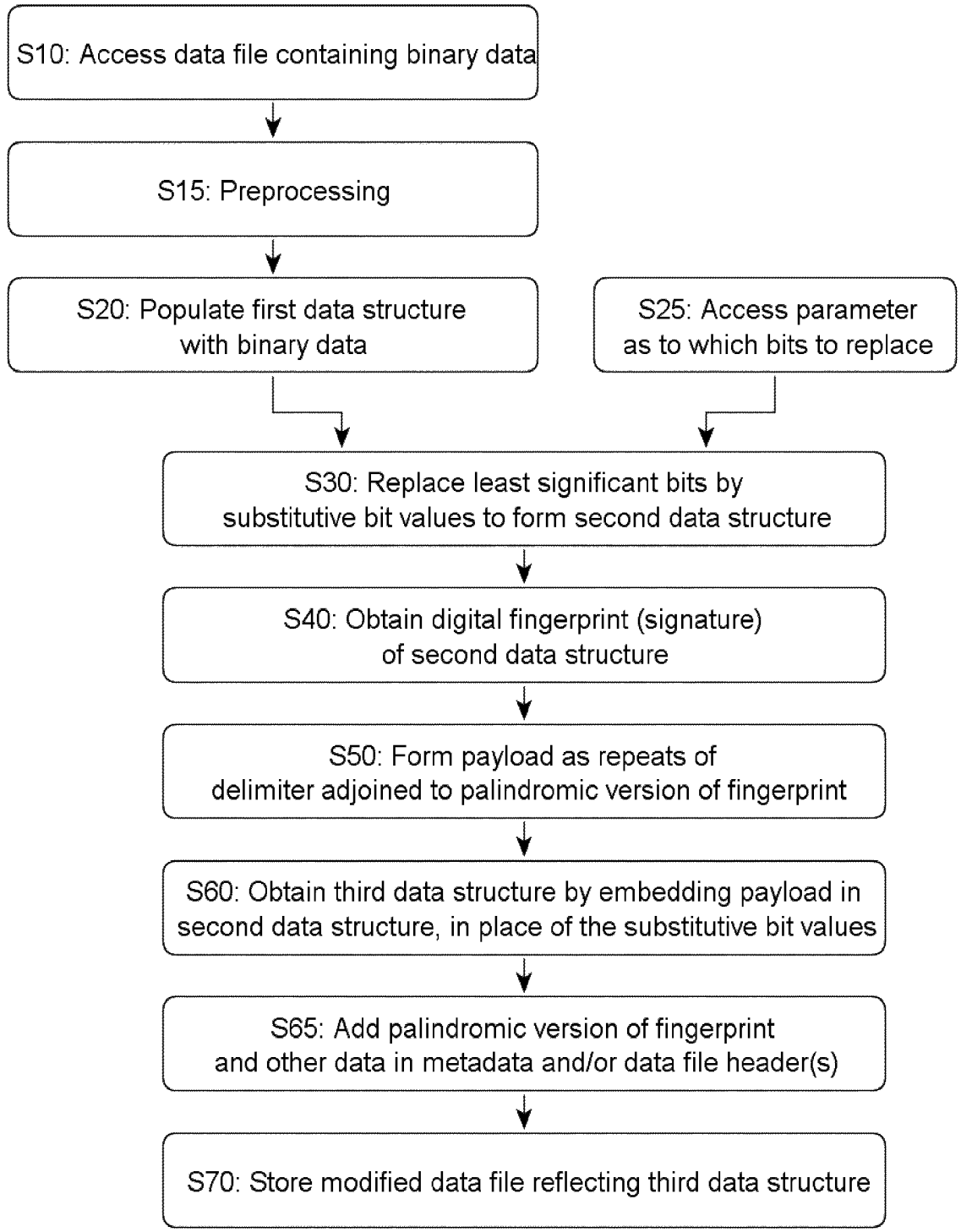

The proposed processing method begins by accessing a data file F1, see FIGS. 1A, 1B, and step S10 in FIG. 4A. The data file F1 is assumed to contain binary data that represent analogue data, such as pixel values for images or digital audio samples for audio files. The data file F1 accessed may notably be a binary file, such as an image file (e.g., having a .jpg, .png, .gif, .bmp, or .tiff extension), a video file (e.g., .mp4, .avi, .mov, etc.), an audio file (e.g., .wav, .mp3, .wma, etc.), a document file (e.g., .doc, .xls, .ppt, .odt, .pdf, etc.), a database file (e.g., .mdb, .sqlite, etc.), or an archive file (e.g., .zip, .rar, .7z, etc.). In variants, the accessed data file is a text file containing binary characters representing analogue data (e.g., base64 or Intel Hex file format). For example, Base64 represent binary data in an ASCII string format. So, in all cases, the accessed data file F1 contains some representation of binary data that represent analogue data. The binary data contained in the accessed data file are also called DAC data (as in digital-to-analogue conversion) in this document, because they are typically meant to be eventually converted to analogue data, e.g., by a printer or a computer (via a screen or speakers).

The file F1 is accessed with a view to populating (step S20) a first data structure 11 with the binary data, as illustrated in FIG. 2A. The first data structure 11 can be regarded as a logical abstraction of the DAC data contained in the accessed data file F1. This data structure 11 can typically be represented as a 2D array, although it may possibly be stored or buffered according to any suitable format in the main memory of the system 1-3 used to perform the method.

Next, a second data structure 12 is obtained at step S30 (FIG. 4A, see also FIG. 2B). The second data structure 12 is obtained S30 by replacing, in the first data structure 11, those data 111 that correspond to some of least significant bits (LSBs) of the binary data with substitutive bit values 121. The replaced bits may for instance be the very least significant bits or the next-to-least significant bits, as discussed later in detail. The bits 111 to be replaced may optionally be stored in a suitable place (e.g., on a server 2 or a distributed system 3), preferably encrypted, prior to replacing them. This makes it possible to reverse the process, if necessary.

A digital fingerprint of the second data structure 12 is subsequently obtaining at step S40. The digital fingerprint is preferably a cryptographic hash of data obtained based on the binary data contained in the second data structure. This hash may notably be obtained in output of a cryptographic signature of the second data structure, as in embodiments discussed below. In variants, the digital fingerprint is obtained by directly hashing the second structure 12. In principle, however, other types of digital fingerprints may be contemplated.

A binary representation of a payload is then formed at step S50, with a view to embedding it in the second data structure. The payload includes repeats of a sequence. That is, the sequence is the repeated pattern. The repeats in the payload are preferably continuous (i.e., without any intercalated values), such that the sequence continuously repeats in the payload. Interestingly, the sequence contains a palindrome, which is based on the digital fingerprint. So, the sequence includes a palindromic version of the digital fingerprint. Practical examples of palindromes are given later. Eventually, the palindromic repeats are converted to binary values, to obtain said binary representation.

Figure 3B:
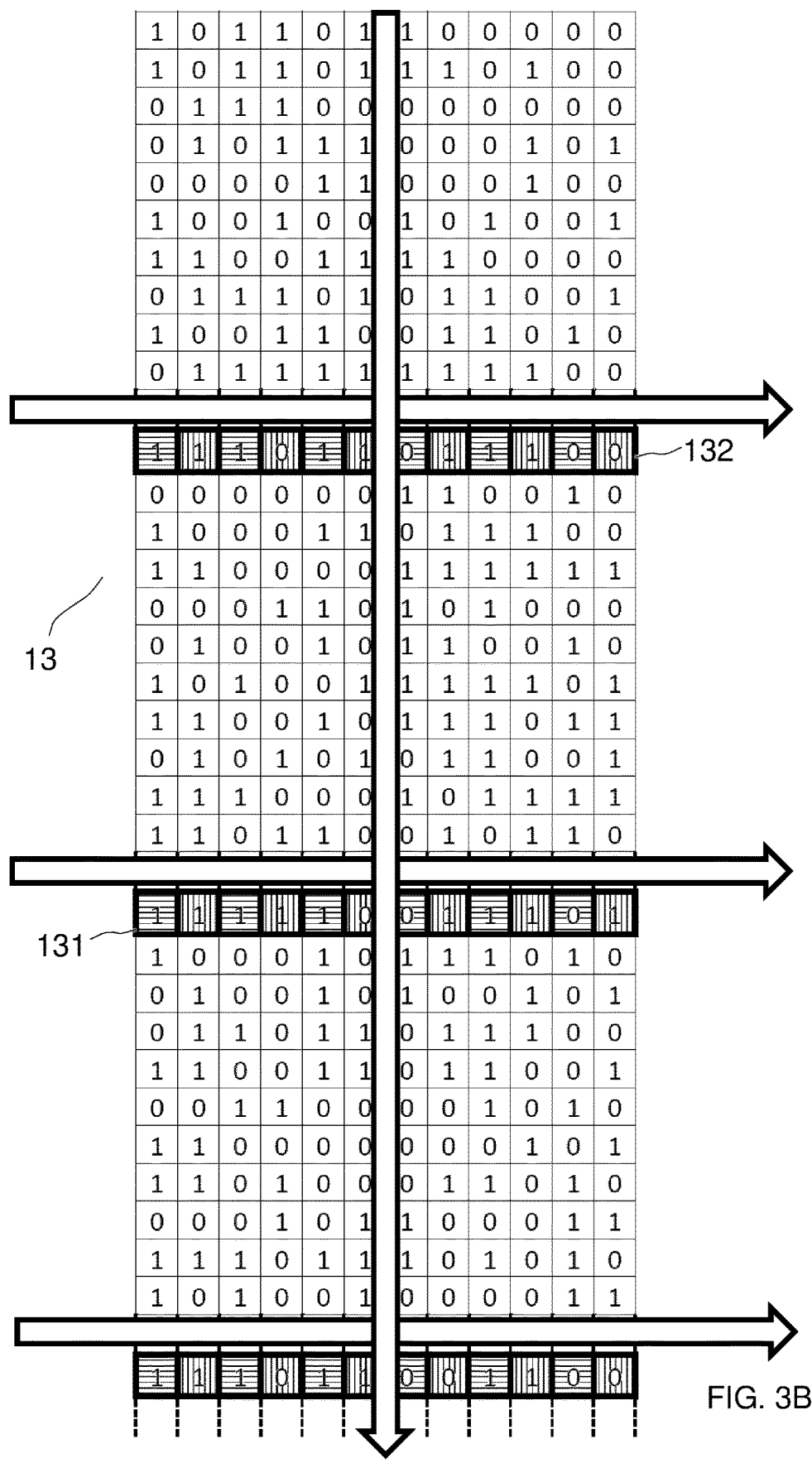

A third data structure 13 is subsequently obtained S60 by embedding the binary representation of the payload 131, 132 in the second data structure 12, in place of the substitutive bit values 121. In the following, this process is referred to as the payload embedding (or the like), for simplicity, even though this is a binary representation of the payload that is embedded. A preferred embedding process is illustrated in FIGS. 3A and 3B. Still, several types of payload embedding processes can be contemplated, as discussed later in detail.

Eventually, a modified data file F1*m* is stored (e.g., in a user computer) at step S70. The modified data file F1*m* includes binary data of the third data structure 13. Note, the modified data file F1*m* is stored according to any suitable format and encoding process. Thus, the modified data file F1*m* will not necessarily contain the third data structure as such. Rather, use is made of a procedure that converts the third data structure 12 into data stored as part of the modified data file F1*m*, according to some suitable format. This procedure is further assumed to be invertible, whereby the third data structure can normally be obtained from the modified data file F1*m*.

Further comments are in order. To start with, the first data structure 11 is preferably populated in-memory, e.g., by populating a data structure in the main memory of the computerized system 1-3 used to perform the present method. Similarly, the data structures 12, 13 are preferably modified in-memory too. Since the data structures 11-13 are preferably built or modified in-memory, they will typically not co-exist as distinct objects in the main memory (or cache) of the computerized system 1-3. That is, each of the data structures 11, 12 gives rise to the next data structure 12, 13, once modified.

The concept of least significant bits LSBs is known per se. The LSBs of the binary data refer to those bits of least significance (i.e., having less potential value) with respect to the corresponding analogue data. Note, the least significant bits (plural) usually refer to the several bits that are close to and include the very least significant bit (e.g., the last bit in a most significant bit first ordering). So, in the present context, the replaced bits do not necessarily need to be the very least significant bits; they may for instance be the next-to-least significant bits or, even, more significant bits. This may depend on the bit encoding scheme used and design options. Which LSBs to substitute can for instance be determined by a configurable parameter. This parameter may for instance be set on-the-fly by the computer system 1-3, based on a particular context (e.g., type of DAC data) or according to some user input or preference. However, the substituted bits cannot be the most significant bits. Incidentally, that the present approach is agnostic to the actual order of the bits (most vs. least significant bit first).

The substitutive bit values 121 are dummy values, meant to be eventually replaced S60 by bit values of the binary representation of the payload. The substitutive bit values 121 can for instance be all 0s as assumed in FIGS. 2B and 3A. In variants, they may all be 1s or consist of a pre-determined, pseudo-random sequence, for better concealment. In all cases, the substitutive values are obtained according to a predetermined rule. Importantly, only the LSBs 111 are replaced by the substitutive bit values 121 and only the substitutive bit values 121 are eventually replaced S60 by the binary values 131, 132 of the binary representation of the payload.

The palindrome can for instance be formed by concatenating a reversed version of the digital fingerprint with the original fingerprint. For example, assume that the digital fingerprint (i.e., a hash code) can be represented as the string "e4b69801c", for simplicity (digital fingerprints are typically much longer in practice). Then, a palindrome may be formed as the following string: "c10896b4ee4b69801c". In variants, palindromes may possibly be formed based on a truncated version of the mirrored string, e.g., as "c10896b4e4b69801c" or "c10896bb69801c". Further variants can be contemplated.

The payload is the concealed message. The palindromic repeats forming the payload can be embedded vertically and/or horizontally. That is, the data structures 11, 12 (FIGS. 2A and 2B) are normally representable as 2D arrays of the binary data, each including rows corresponding to the (substituted) LSBs. The bit values in these rows can thus be replaced row-wise and/or column-wise by bit values corresponding to the palindromic repeats. Advantageously, the payload may even be embedded both row-wise and column-wise, using an orthogonal interspersing approach, as in preferred embodiments discussed later.

Thanks to the present approach, the presence of the embedded digital fingerprint can easily be detected (e.g., for authorship/inventorship detection and protection purposes) by inspecting the LSB rows of a 2D array representation of the data files. Because palindromic repeats are embedded, the rows can be scanned in several directions, i.e., from left to right or right to left (if a row-wise embedding is used), from top to bottom or bottom to top (for column-wise embedding), or both (when using an orthogonal interspersing approach). Thus, the digital fingerprint can be detected even if the file (e.g., an image or table) is transformed by mirroring it horizontally and/or flipping it vertically. In other words, the proposed approach increases the detectability of the data files, even if such files are altered according to transformations such as listed above.

The proposed solution can be applied to a variety of data types. By construction, it is well suited for images (e.g., 2D or 3D images) or video frames, since the corresponding data files already contains DAC data. However, the proposed solution can also be applied to other types of data files, such as audio files and other data file types, as discussed later in reference to particular embodiments.

The following describes particularly preferred embodiments of the invention. To start with, the payload is preferably formed S50 so as for the sequence to additionally include a binary representation of an asymmetric delimiter. That is, an asymmetric delimiter is adjoined to the palindrome to form the repeated pattern. The sequence may actually consist of only the asymmetric delimiter and the palindrome, where, e.g., the asymmetric delimiter is concatenated to the palindrome. As said, the payload preferably consist of repeats of the basis patterns, without any intercalated value.

The delimiter is meant to act as a flow detection header. The header eases the detection of the palindrome. All the more, it makes it possible to easily determine whether a file was altered i.e., flipped and/or mirrored, and, if so, how it was altered. Note, however, that if continuous repeats of the sole palindromes are embedded, the file can still be detected by the detection algorithm. However, the detection algorithm will not be able to conclude whether and how the file was altered in that case, e.g., in which direction it was flipped and/or mirrored.

For example, the delimiter may be formed based on the asymmetric string "#@", such that the repeated pattern may be written as the string "#@c10896b4ee4b69801c", assuming that the palindrome is "c10896b4ee4b69801c", as in the previous example. In practice, however, the string representation of the sequence will likely be much longer.

Eventually, the sequence is obtained by converting such a string to binary data. For example, applying an 8-bit encoding scheme to the string "#@c10896b4ee4b69801c" gives rise to the following sequence (using spaces as delimiters, for convenience):

```
00100011 01000000 01100011 00110001 00110000 00111000 00111001
00110110 01100010 00110100 01100101 01100101 00110100 01100010
00110110 00111001 00111000 00110000 00110001 01100011.
```

This sequence can be rewritten as the following vector:
{0, 0, 1, 0, 0, 0, 1, 1, 0, 1, 0, 0, 0, 0, 0, 0, 1, 1, 0, 0, 0,
1, 1, 0, 0, 1, 1, 0, 0, 0, 1, 0, 0, 1, 1, 0, 0, 0, 0, 0, 0, 1,
1, 1, 0, 0, 0, 0, 0, 1, 1, 1, 0, 0, 1, 0, 0, 1, 1, 0, 1, 1, 0,
0, 1, 1, 0, 0, 0, 1, 0, 0, 0, 1, 1, 0, 1, 0, 0, 0, 1, 1, 0, 0,
1, 0, 1, 0, 1, 1, 0, 0, 1, 0, 1, 0, 0, 1, 1, 0, 1, 0, 0, 0, 1,
1, 0, 0, 0, 1, 0, 0, 0, 1, 1, 0, 1, 1, 0, 0, 0, 1, 1, 1, 0, 0,
1, 0, 0, 1, 1, 1, 0, 0, 0, 0, 0, 1, 1, 0, 0, 0, 0, 0, 0, 1, 1,
0, 0, 0, 1, 0, 1, 1, 0, 0, 0, 1, 1}.

The above sequence consists of 160 bit values, i.e., corresponding to 20×8 binary values in an 8-bit encoding scheme. Note, encoding ASCII character in binary requires at least 7 bits. In practice, the 8th bit (all 0s in the above example) is added and used as a parity bit to detect transmission errors. Thus, one may possibly use 7 bits only, instead of 8 bits, to encode the ASCII representation of the payload. In that case, the above sequence becomes:

```
0100011 1000000 1100011 0110001 0110000 0111000 0111001 0110110
1100010 0110100 1100101 1100101 0110100 1100010 0110110 0111001
0111000 0110000 0110001 1100011,
``` which, as a vector, can be written:
{0, 1, 0, 0, 0, 1, 1, 1, 0, 0, 0, 0, 0, 0, 1, 1, 0, 0, 0, 1, 1, 0,
1, 1, 0, 0, 0, 1, 0, 1, 1, 0, 0, 0, 0, 0, 1, 1, 1, 0, 0, 0, 0,
1, 1, 1, 0, 0, 0, 1, 0, 1, 1, 0, 1, 1, 0, 1, 1, 0, 0, 0, 1, 0, 0,
1, 1, 0, 1, 0, 0, 1, 1, 0, 0, 1, 0, 1, 1, 1, 0, 0, 1, 0, 1, 0,
1, 1, 0, 1, 0, 0, 1, 1, 0, 0, 0, 1, 0, 0, 1, 1, 0, 1, 1, 0, 0,
1, 1, 0, 0, 0, 1, 0, 1, 1, 1, 0, 0, 0, 0, 1, 1, 0, 0, 0, 0, 0,
1, 1, 0, 0, 0, 1, 1, 1, 0, 0, 0, 1, 1}.

The last vector has 140 components, instead of 160 in the previous example. Note, while the basis pattern involves a palindrome (i.e., "c10896b4ee4b69801c"), the binary representation of this palindrome is not necessarily a palindrome.

As illustrated above, the sequence can possibly be encoded off-byte. That is, the steganographic encoding may use 7 bits instead of 8 bits, thus further obfuscating the embedded information. In particular, repeated patterns like the delimiters between the palindromes are less likely to be detected when encoded off-byte. More generally, the number of bits used to encode the binary data contained in the accessed data file F1 may differ from the number of bits used to encode the sequence. The encoded values just need be compatible with the encoding scheme. E.g., ASCII characters allows a 7-bit encoding.

Preferably, the number of bits used to encode the sequence is a configurable parameter, which can be set S25 by the backend system (e.g., a server 2 or a distributed system 3) or, even, the end user or the client process 1. This parameter may possibly be automatically set, e.g., depending on the type of files (image, audio, etc.) and the included DAC data. This parameter is then used to set the number of bits according to which the sequence is eventually encoded.

As illustrated in FIGS. 2A-3B, each of the first data structure 11, the second data structure 12, and the third data structure 13, can typically be represented as a 2D matrix of binary data. Each matrix includes columns and rows. In the examples, the matrices are formatted in such a manner that some of the rows, like row 111 in FIG. 2A, initially correspond to the very least significant bits. Such data 111 are replaced by substitutive bit values 121 (all 0s) in FIG. 2B. That is, a subset of the rows of the first data structure 11 are replaced by substitutive bit values 121 to form the second data structure 12. The latter will typically include several substituted rows 121, as shown in FIG. 3A. As said, the initial binary values 111 may possibly be stored, prior to inserting the substitutive bit values 121, so as to be able to regenerate the initial file F1, if necessary. The second data structure 12 shown in FIG. 2B or 3A is used to obtain the digital fingerprint.

Advantageously, the payload 131, 132 can be embedded S60 by orthogonally interspersing columns and rows formed from the payload (i.e., from the binary representation thereof) through the subset of the rows 121 in the second data structure 12, i.e., the rows that contain the substitutive bit values 121. This is illustrated in FIGS. 3A and 3B. The rows 121 in FIG. 3A include the substitutive bit values 121, while the same rows include different binary data 131, 132 in FIG. 3B, resulting from the orthogonal interspersing of the payload binary values. An orthogonal interspersing means that the payload is embedded both horizontally and vertically in the 2D matrix corresponding to the second data structure 12 (FIG. 3A) to obtain the third data structure 13. I.e., bit values of the payload are alternately stored row-wise and column-wise, in elements of the rows that formerly contained the substitutive values 121.

As a result (FIG. 3B), two consecutive bit values in each replaced row (corresponding to rows 121 in FIG. 3A) now corresponds to: (i) an element 131 of an embedded row of the payload and (ii) an element 132 of an embedded column of the payload. The matrix components corresponding to the embedded bit values 131, 132 have distinct patterns in FIG. 3B.

Note, "consecutive" means immediately consecutive. In the example of FIG. 3B, any two consecutive elements of the substituted rows correspond to elements from the payload columns and the payload rows. This is because the width of the matrix is matched to the length of the sequence in this example. Namely, the first data structure 11 is assumed to be initially dimensioned according to an expected bit length of the sequence. More precisely, the length of each row of the first data structure 11 corresponds to twice the expected bit length of a binary representation of the sequence. The reason for the factor 2 is to enable the orthogonal interspersing, whereby payload column values are intercalated between two successive payload row values. The second and third data structure 13 inherit, each, the same dimensions as the first data structure's. This way, each row 121 of the second data structure 12 (FIG. 3A) can be altered to store all the elements of exactly one binary vector corresponding to the sequence (embedded row-wise), between which elements of the same binary sequence are intercalated (this time column-wise) across such rows. This gives rise to interwoven sequence elements, as illustrated in FIG. 3B.

In the example of FIG. 3B, the sequence is assumed to be 6-bit long only, for the sake of illustration. Namely, the sequence is assumed to be {1, 1, 1, 0, 1, 0} in this example. Of course, it would likely be much longer in practice. The width of the data structure is accordingly dimensioned and is thus 12-bit long, to allow the orthogonal interspersing. Accordingly, in each patterned row (initially corresponding to rows 121 in FIG. 3A), the $1^{st}$, $3^{rd}$, $5^{th}$, $7^{th}$, $9^{th}$, and $11^{th}$ elements 131 correspond to respective elements of the sequence {1, 1, 1, 0, 1, 0}. The $2^{nd}$, $4^{th}$, $6^{th}$, $8^{th}$, $10^{th}$, and $12^{th}$ elements of the three patterned rows correspond to vertical embeddings of the same sequence. Note, the vertically embedded elements that are visible in FIG. 3B correspond to triplets of the above sequence, because only three substituted rows appear in this drawings. That is, elements {1, 1, 1} are embedded in the $2^{nd}$ elements of the three patterned rows, elements {0, 1, 0} are embedded in the $4^{th}$ elements of these rows, etc. The vertical alignment depends on the congruity (or commensurability) of the length of the binary representation of the sequence with respect to the column length of the data structures 11-13. This, however, is unimportant since the sequence repeats, also vertically, such that the detection algorithm is able to detect by scanning the values vertically.

In variants where the binary payload is embedded in a row-wise manner only (without interspersing column elements thereof), the length of each row of the first data structure 11 is halved. That is, the length of each row of the first data structure 11 corresponds exactly to the expected bit length of the binary sequence (instead of twice this length). As noted earlier, the orthogonal interspersing makes it easier to detect potential correspondences between files, even if some of these files are horizontally mirrored and/or vertically flipped. In addition, when used together with asymmetric delimiters, the orthogonal interspersing makes it possible to diagnose whether a matching file was flipped and or mirrored.

In addition to embedding the payload in place of LSBs of the DAC data, the palindrome may possibly be added S65 in one or more headers of the modified data file F1*m*, e.g., as part of metadata thereof. This operation may be performed prior to or after embedding the payload, and prior to storing S70 the modified data file F1*m*. Adding the palindrome to other sections of the files allows redundancy to be achieved, which eases the file detection, as explained later in detail. The palindrome may for example be added S65 in the author section or the comment section of the metadata header, and/or in data block headers.

In embodiments, the digital fingerprint is obtained S40 by hashing the content of the second data structure 12, using any suitable one-way function. A cryptographic-like hashing function is preferably used. In that respect, step S40 is preferably performed as part of cryptographically signing a content corresponding to the structure 12. In that case, the method may further instruct to store the resulting signature, e.g., in the header of a distinct file, notably to ease a later verification.

The cryptographic signature may notably be obtained thanks to a private cryptographic key of the user. Note, the embedding methods described herein are preferably performed on the user computer 1 (or in the user domain), e.g., as part of an algorithm running in a web browser of the user computer 1, as assumed in FIGS. 1A and 1B. More generally, several application scenarios can be contemplated. A preferred scenario is one where the original data stays with the user computer 1 (or the user domain) and is never accessed (in the clear) by the backend system (i.e., a remote server 2 or a distributed system 3). The user files can be signed and timestamped via a local application. In variants, the user files are signed and timestamped via a third party 2 (e.g., involving a public key infrastructure), yet based on hashes of the user files. This way the data safely stay with the user and never leave the user domain in the clear. In variant, a service may propose the user to upload the original data to the server 2, e.g., to securely store the files and prevent inadvertent alterations of the files. In all cases, the embedding methods proposed herein allow files to obtained, which include some authorship protection.

So far, the present methods assume that the accessed files include binary data corresponding to some analogue data. Now, this may not always be the case in practice as some types of files do simply not include DAC data. Still, simple workarounds can be contemplated, as in embodiments discussed now in reference to FIG. 4B.

Such embodiments revolve around adding DAC data (e.g., an image or audio) to a file, if necessary, i.e., if this file F0 does initially not contain any such DAC data. In that case, an image may simply be added S130 to the initial data file F0. This way, a data file F1 is obtained, which contains DAC data and can therefore be processed as described earlier in reference to FIG. 4A. The added AC data just need to be identified S140 as such at some point, for the purpose of implementing the embedding methods. The added data may notably correspond to a watermark feature (e.g., corresponding to an invisible image or background). In less preferred variants, an audio file may be inserted in place of an image. Other types of DAC data may possibly be added.

In practice, the present methods may systematically check for the presence of DAC data in the data files. Namely, when opening S10 a data file F1, an algorithm may be run to check for images in the file. If no such image can be detected (FIG. 4B, step S120: No), then the algorithm adds an image as described above. If, however, an image can be found (S120: Yes), then the algorithm simply identifies S140 the corresponding data as DAC data to be used for embedding the payload.

Another but related aspect of the invention concerns a data file F1*m* as typically obtained thanks to methods such as described above. That is, the data file F1*m* includes DAC data, i.e., binary data that represent some analogue data. Moreover, the data file F1*m* further includes a payload 131, 132, meaning that a binary version of the payload is embedded in the data file, in place of some least significant bits of the binary data. That is, the binary representation of the payload is embedded at locations that would be the locations of such least significant bits of the binary data should the payload not be embedded in the file.

As per the present approach, the payload includes repeats of a sequence, which contains a palindrome. The palindrome is based on a digital fingerprint of a variant of the data file F1*m*. That is, this variant contains substitutive bit values 121 in place of the binary payload. Such a data file F1*m* can thus potentially be used by verification methods to detect some correspondence with other data files, as in embodiments described below.

Various methods can be contemplated to verify the authorship of such files. Such methods relate to another aspect of the invention, which is now described in reference to FIG. 4C. The verification starts by accessing S110 a data file. Again, this data file is assumed to contain binary data that represents analogue data. The algorithm scans S120 through a representation of the binary data of the accessed data file to detect a sequence of a payload embedded in the binary data (again, this is a binary representation of the payload that is embedded in the binary data). As per the present approach, the payload includes repeats of a sequence that contains a palindrome. As explained above, the palindrome has been obtained based on a digital fingerprint of a variant of the accessed data file, where this variant contains substitutive bit values 121 in place of the embedded payload. The palindrome contained in the detected sequence, if any, is subsequently compared S140 to reference palindromes, corresponding to reference data files. The aim is to identify a potential correspondence between the accessed data file and one of the reference data files F1m. A correspondence means a match, subject to possible alterations such as described earlier (mirror, flip, amongst other possibilities). Note, in certain circumstances, the comparison may be limited to a few reference palindromes, possibly a single palindrome (e.g., when assessing two particular files for forensic purposes). The reference palindromes may be stored in several places, notably in a database connected to the verifying entity, which is typically implemented in the backend system 2, 3.

Applying a verification method as described above may possibly lead to identify a correspondence between the data file accessed at step S110 and a data file F1m as stored at step S70 using the embedding process described earlier in reference to FIG. 4A.

This verification method works on a certain representation of the accessed file, which representation must be consistent with the representation used to embed the payload. Thus, the verification method will typically attempt, upon accessing S110 the file, to populate a data structure similar to the data structures 11-13 used to initially produce the files. The then verification algorithm may simply scan through the data structure to identify the sequence. In variants, this data structure may implicitly be taken into account by a scanning path (i.e., the scanning algorithm), without it being necessary to explicitly construct this data structure.

As described earlier, the payloads are preferably formed S50 so as for the sequences to include asymmetric delimiters adjoined to the palindromes. Now, when verifying an altered file (i.e., a file that has been obtained by altering a protected file), the detected sequence S120 will includes an altered version of the asymmetric delimiter. Thus, the altered version of the delimiter may advantageously be compared with the initial version of the asymmetric delimiter corresponding to the matched palindrome. This makes it possible to determine the type of alteration that the accessed data file was subject to, with respect to the reference data file F1m, e.g., whether the altered file was flipped or mirrored. That is, comparing the palindromes makes it possible to identify a match, while the comparison of the delimiters further allow a diagnostic to be obtained (e.g., as to the orientation of the alteration).

Further certainty may be achieved by comparing the identified palindrome to further versions of this palindrome, as stored in headers and/or metadata of the file, if any. I.e., in embodiments, the verification attempts to further extract S130 the palindrome from one or more headers, and/or metadata, of the data file accessed at step S110. The extracted palindrome can then be compared S145 to the palindrome as obtained from the identified sequence, to confirm the detection.

Redundantly storing (or embedding) palindromes allow increased certainty as to the verification, as well as diagnostic possibilities. By comparing S145 all the detected palindromes, the verification method may refine its diagnostic with respect to a potential alteration to the file. If one (normally redundant) element fails to show up, the verification algorithm may deduce that some specific alteration took place and accordingly raise a flag of inconsistency. More sophisticated pipelines can be contemplated; examples are given in section 2.1.

As noted earlier, the digital fingerprints are preferably obtained S40 as part of cryptographic signature processes. Such signatures may notably be obtained thanks to private cryptographic keys of the users, should the embedding methods have access to such keys. In that case, signatures of the protected files are available. Such signatures may need to be verified, step S160, notably when detecting a correspondence between two files. A signature corresponding to a detected palindrome can be verified S160 thanks to a public key corresponding to the private key as initially used to obtain the fingerprint.

For example, a hash of the second data structure 12 may initially be obtained, prior to signing the hash. E.g., the hash calculated from the structure 12 is instructed to be signed by a program executing in the web browser of the user machine 1. This program instructs to sign the hash using a private key of the user. The private key is stored in the user computer 1 or somehow made available for signing, e.g., thanks to a paired hardware security module (HSM). This program eventually returns a signed hash. Note, either the initial hash code or the final hash code may be used as digital fingerprint. The public key of the user can safely be shared with the server 2 or with peers of a distributed computing system 3. In turn, this public key can be used to both identify the user 1 and check the signature, notably for authorship/ownership verification purposes.

In variants, the signature process may use the whole content of the data contained in the second data structure 12 in input, instead of a hash thereof. This nevertheless produces a hash in output. That is, the digital signature is a one-way hash of the original data that was encrypted with the signer's private key. In that case, the cryptographic signature can be regarded as producing a digital fingerprint of the second data structure 12. And this digital fingerprint can be used to obtain the desired palindrome.

Thanks to the signature process, a verifying entity 2, 3 may not only verify S160 that the signature (or a corresponding fingerprint) corresponds to a given data file, but also that the signature is valid, thanks to the corresponding public key. In practice, the verifier 2, 3 may further want to ascertain the public key thanks to a digital certificate issued for this public key. To that aim, the verifier 2, 3 may store signatures along with certificates (or links thereto), so as to be able to verify the authenticity of the signatures at all times. The signatures and certificates (or links thereto) can for instance be stored in a database, where they are typically indexed by identifiers of the data files.

More generally, the verifying entity 2, 3 may verify the user signatures on multiple occasions, e.g., during the user enrolment, the submission of a user file, and/or the verification of authorship/ownership of matched files.

Figure 6:
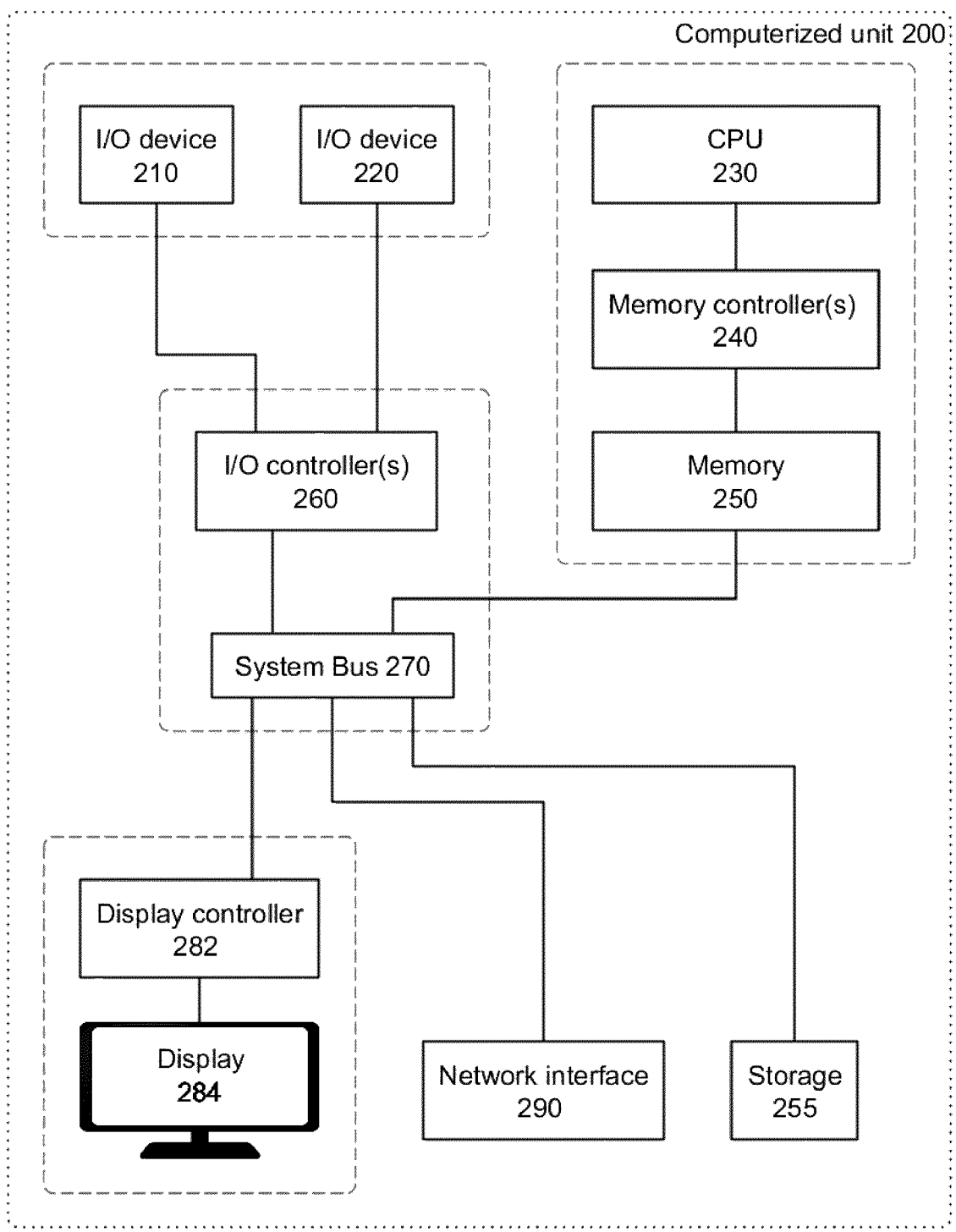
FIG. 6 schematically represents a general-purpose computerized unit, suited for implementing one or more method steps as involved in embodiments of the invention. This unit may for instance form part of a computerized system such as shown.

Referring to FIGS. 1A, 1B, and 6, a further aspect of the invention is now described, which concerns a computerized system 1, 2, 3 for processing data files in accordance with the present methods. This system may comprise one or more computerized units such as unit 200 shown in FIG. 6. The system includes at least a computer 1, e.g., a user computer. In addition, it preferably includes a backend system 2, 3, i.e., a remote system such a server 2 (as in FIG. 1A) or a distributed system 3 (as in FIG. 1B), with which the user computer 1 interact. In that case, the user computer is a client of the backend system 2, 3. In practice, several client computers 1 (or processes) may interact with the backend system 2, 3. The distributed system 3 comprises a set of nodes, which may be configured as a blockchain or, more generally, a distributed ledger system. The nodes of the system 3 may be configured to act as servers for clients 1 of the system 3. In general, the clients 1 may be applications (e.g., run on a personal computer, a smartphone, or a tablet) or automated processes, e.g., implemented in a cloud, as containers, virtual machines, or computer devices.

Each computerized unit 200 involved in the system 1-3 typically comprises storage means 255, which stores computerized methods (e.g., in the form of software). In operation, such computerized methods can be loaded in the main memory 250 of this machine 200, for the processing means 230 of the unit 200 to perform steps according to the present methods.

As a result, the computerized system 1-3 is configured to access a data file containing DAC data and accordingly populate a first data structure 11 with the binary data accessed. It further allow a second data structure 12 to be obtained by replacing LSBs with substitutive bit values 121 and a digital fingerprint of the second data structure 12 to be obtained (e.g., as part of a cryptographic signature process). The system is further configured to form a binary representation of a payload that includes repeats of a sequence containing a palindrome, where the latter is obtained based on the digital fingerprint, and obtain a third data structure 13 by embedding the binary representation of the payload in the second data structure 12, in place of the substitutive bit values 121. For completeness, the system is also adapted to store a modified data file F1$m$ including binary data of the third data structure 13.

As noted earlier, the system may notably include a user computer 1, which is configured to execute such computerized methods as part of a web browser run on the user computer 1. Still, the computer 1 may interact with the backend system 2, 3, e.g., for enrolment, file registration, or verification purposes. The verification steps are preferably performed at the backend system 2, 3, or at least involve interactions between the computer 1 and the backend system 2, 3. Additional aspects of the computerized system 1-3 and computerized units 200 are discussed in sect. 2.3.

A further, yet related aspect of the invention concerns a computer program product for processing a data file in accordance with the present methods. The computer program product comprises a computer readable storage medium having program instructions embodied therewith. The program instructions are executable by processing means 230 of one or more units 200 of a computerized system 1-3 such as described above, to cause the processing means to take steps as described earlier. Additional aspects of computer program products are discussed in sect. 2.3.

The above embodiments have been succinctly described in reference to the accompanying drawings and may accommodate a number of variants. Several combinations of the above features may be contemplated. Examples are given in the next section.

2. Specific Embodiments—Technical Implementation Details 2.1 Preferred Embodiments This section describes preferred embodiments, which allow authorship protection and copy/sampling detection that are more resilient to transformations of and changes to original files by third parties or plagiarists.

In such embodiments, cryptographic hashes are inserted in the file metadata/headers to provide general protection and further confirm the detected palindromes. In addition, steganographic fingerprints are embedded in the files to protect against 1:1 copies, cuts, and/or samples thereof. Better protection is achieved, thanks to the fact that palindromic versions of the fingerprints are embedded, which protect against additional transformations, such as horizontal mirror, vertical flip, horizontal/vertical compression, insert, and/or merge operations for images, this also depending on how the palindromes are embedded. As described in the previous section, they are preferably orthogonally interspersed, so as to be able to detect both horizontal and vertical transformations. As the skilled person may further realize, orthogonally interspersing the palindromes may further protect against retouches, local editing, and radial transformations. Additional algorithms may be involved in the detection pipeline, such as masked normalized cross-correlation algorithms to improve the detection of radial transformations, or mean-squared error (MSE) algorithms combined with techniques based on structural similarity indices for detecting colour/saturation changes. Thus, various algorithms can be involved, which are preferably executed in a branched pipeline.

The present methods can also be applied to other file formats such as audio file formats, where steganographic palindromes can be embedded too. Still, for most audio file formats (in particular for .mp3 files), steganographic hashes cannot be embedded in a continuous byte array, but only in the amplitude and frequency values of an encoded block. Yet, the overall principle remains unchanged, insofar as the embedding methods operate on an abstraction (e.g., a 2D matrix) of the DAC values. In particular, inserting a cryptographic hash in the file metadata provides general protection, while embedded steganographic hashes provide protection against 1:1 copy and audio sampling. Other types of transformation may be detected by further adding ID3 Tags in/across each MP3 frame header, for example.

Other types of files may not include any DAC data at all. This is notably the case for many files of the common formats of digital non-media files, such as, e.g., .pdf, .docx, and .pptx files. Yet, it is still possible to steganographically embed a payload based on a palindromic fingerprint, e.g., corresponding to the output hash code of a cryptographic signature. A preferred approach is to add a watermark feature (e.g., an invisible background or picture) to the file and then apply the same procedure as with media files, i.e., obtain a digital fingerprint of the file version in which LSBs have been replaced by dummy bit values, and then embed a binary version of a payload consisting of repeats of asymmetric delimiters adjoined to the palindromes, as described in section 1, though the payload is inserted into the sole data capturing the added watermark feature. The palindromes can further be added to the metadata (comment, author, etc.). Alternatively, the fingerprints and palindrome may be obtained ex ante based on the sole watermark feature (an image), which is then added to the file.

Preferred embedding methods have been described in the previous section. Such methods may notably use existing software development kits (SDKs), to programmatically implement the different file type handlers. As said, such methods are preferably implemented on the user (or client) side, e.g., as part of web browser executing on the user machine. However, client-side execution may not always be possible for some file formats. In that case, the embedding may still be performed at the backend system 2, 3. Ideally, such operations should nonetheless be transparently communicated to the user in the workflow.

The palindromes (or the fingerprints) can be stored as part of metadata/file headers, using any suitable method; Such methods are known per se. In particular, the palindromes can be added to the comment and author sections in the file metadata. They are further stored in the backend system 2, 3 in a suitable database DS, for subsequent verification operations.

A preferred procedure for orthogonally interspersing the binary payload is the following. After having accessed a given data file containing DAC data, all LSBs of DAC amplitude values (for each data point) are copied to a bit array (for archiving purposes, e.g., as part of a database DS) and then set to zero in the original file (as shown in FIG. 3A). Then, a cryptographic signature of the file is generated, where the input file contains the LSB-zeroed data (without the heading and trailing data, or the interspersed data), using the user's private key. E.g., the keys may be obtained according to the Rivest-Shamir-Adleman (RSA) algorithm, and the output hashes may be generated thanks to an SHA-n algorithm. The result is a signature that can be verified with the public key of the owner of the file. The signature output is then taken, copied, and the copied hash is mirrored and concatenated to the original signature, which results in a palindrome. The palindrome ensures that the hash can always be read in two directions, e.g., even after mirroring or flipping an image, which inverts the direction of the byte arrays holding the LSB bits with the signature. Next, the payload is formed as continuous repeats of a sequence (or pattern) including the palindromic signature, delimited by an asymmetric delimiter. The latter is preferably a two-byte delimiter. The number of repeats run to the end of the part of the file encoding the DAC data and is defined by the total number of LSBs in the data.

Note, there is a minimal file $s_{min}$ size that can be subjected to the above procedure, which is given by $s_{min}=[(L_{seq})^2 \times E_{steg} \times R_{DAC}]+S_{met}$, where $L_{seq}$ is the length of the basis sequence (corresponding to one palindrome plus the delimiter), $E_{steg}$ is the encoding width (i.e., 6 in the examples of FIGS. 2A-3B), $R_{DAC}$ is the DAC resolution, and $S_{met}$ the size of the metadata, including the sum of the block headers if applicable.

The delimiters between the palindromes are asymmetric rather than palindromic; each delimiter consists of two different bytes. This makes it possible to detect a change of direction with respect to the legitimate files (flipping, mirroring).

Since the RSA SHA-n signature outputs including the delimiters are ASCII codes, the steganographic LSB encoding are advantageously done in 7 bits, instead of 8 bits, thus further obfuscating the hidden traceability information. In particular, repeated patterns (like the delimiters between the palindromes) are less likely to be detected when encoded off-byte.

The orthogonal interspersing of the payload allows a more robust detection algorithm to be achieved. This further makes it possible to obtain additional verifications of conventional upstream transformation detection results, especially in the case of angular/radial transformations of the original data, and a fast verification of upstream mirroring operations. The same conclusion holds for linear compression, where the bit depth remains the same as in the protected file.

To achieve this, the width of the DAC value structures is artificially matched to twice the length of the basis pattern (palindrome+delimiters). This results in rows of interspersed palindromes, distributed across the data structure 13, up to the end of this data structure. The corresponding 2D array may be quite distinct from the original image. Every row and every column embedding the payload starts with a delimiter couplet, followed by a full palindrome. Some residual columns may remain, which are not aligned with a palindrome length, this depending on the congruity of the sequence with respect to the data structure. Note, the 2D data structures happen to filter out file artefacts (like for instance MP3 block headers) and are thus agnostic to a particular encoding or, even, a file type.

The detection may further exploit a redundant signature interlocking, as noted earlier. So, beyond the interspersing of the sequences, the signatures are preferably added to headers and/or metadata.

2.2 Preferred Flows

A preferred flow for embedding a payload is shown in FIG. 4A. At step S10, a data file is accessed, which is assumed to contain DAC data. Step S15 relates to pre-processing steps, where the method performs some verification steps to verify the user and the data submitted (is the user already enrolled? Was the same data already submitted before?). A first data structure is populated at step S20, in accordance with the binary data corresponding to the DAC data. At step S30, LSBs of the first data structure are replaced by substitutive bit values to form second data structure. Such LSBs may first be identified thanks to a parameter set by the system 1-3 or by the user. This parameter is fed at step S25, prior to replacing the LSBs. A digital fingerprint of the second data structure 12 is obtained at step S40, e.g., as part of cryptographically signing the second data structure 12. The payload is formed at step S50, as repeats of a sequence including an asymmetric delimiter adjoined to a palindromic version of the digital fingerprint. At step S60, a third data structure is obtained by embedding the payload in the second data structure, in place of the substitutive bit values. The palindrome is further added in datafile header(s) at step S65, to enable redundancy. Eventually, a modified data file is locally stored S70 on the user machine 1, where the modified file reflects the third data structure 13. The process of FIG. 4A is typically implemented upon the user requesting a file registration at the backend system 2, 3.

Figure 4B:
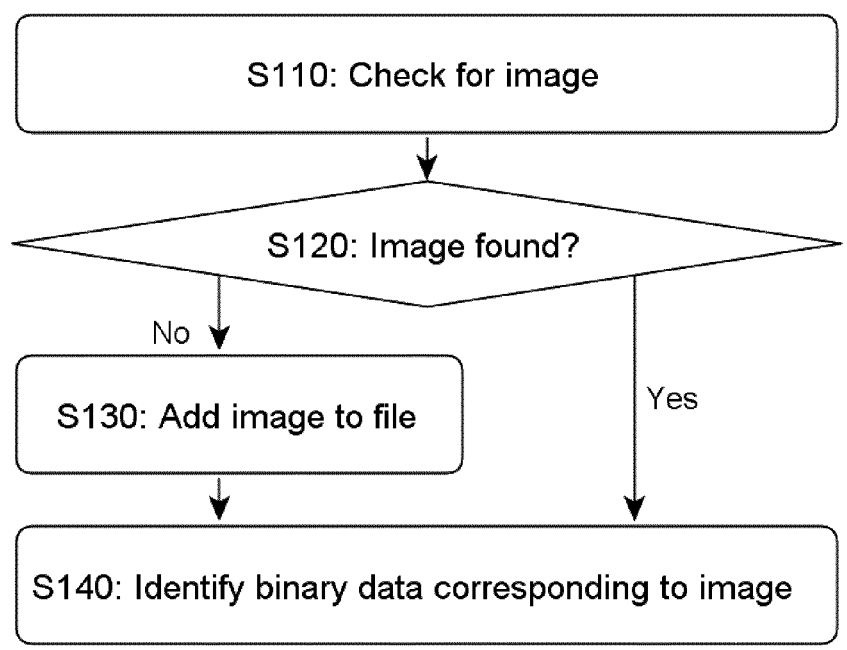

FIG. 4B concerns pre-processing steps performed upon or prior to accessing S10 a data file. The method checks S110 whether an image is embedded in the data file. If an image is found (S120: Yes), corresponding binary data are identified at step S140, with a view to subsequently enabling the payload embedding. Else (S120: No), a watermark feature is added to the file and the corresponding data are identified S140 as such.

Preferred verification steps are shown in FIG. 4C. At step S110, a further data file is accessed, which data file contains DAC data. The data file is scanned S120 to detect an embedded palindrome, if any. In addition, the verification method obtains S150 the signature corresponding to the palindrome and verifies S160 the signature, thanks to the public key associated with the private key that was used to sign the second data structure. The detected palindrome is compared S140 with reference palindromes as stored in a database DS, to identify a potential match. In addition, this palindrome may be compared to other versions thereof, as extracted at step S130 by scanning the data file headers and/or metadata. Other file data may be extracted S130 on this occasion. Eventually, a diagnostic is performed S145 based on all the detected and extracted data. E.g., does the file match a referenced file? Was it transformed? What type of transformation was used? Etc.

Figure 5:
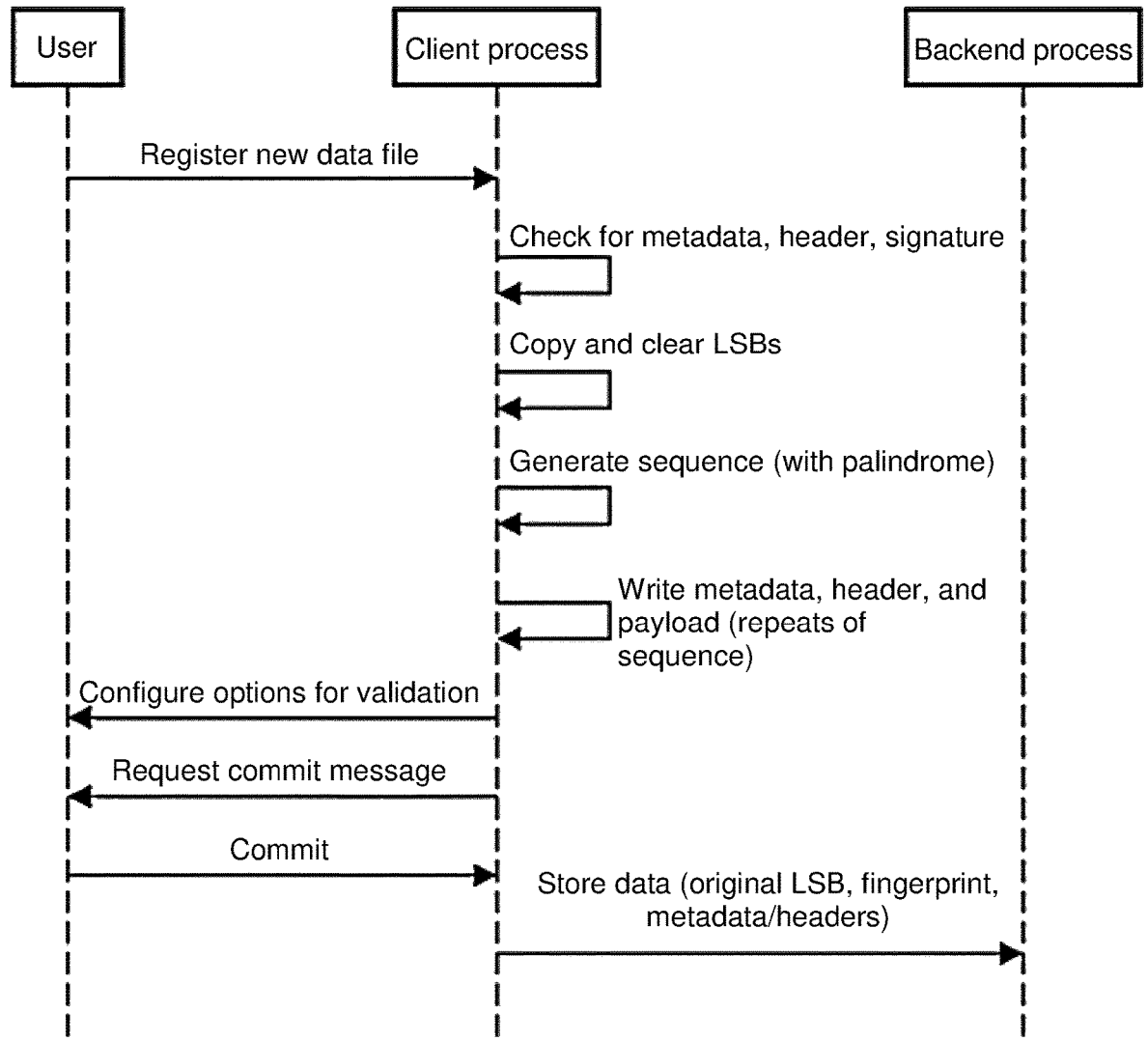
FIG. 5 is a sequence diagram illustrating high-level interactions between a user computer, a client process, and a backend process, according to embodiments.

FIG. 5 is a sequence summarizing steps as involved in preferred embedding methods, which assume that a user takes steps to register a new data file. Note, the user is assumed to have already enrolled with the backend system 2, 3. Thus, a suitable key pair is assumed to have already been generated. The private key remains safely stored in the user computer (or a paired device), while the public key is shared with the backend system 2, 3. Upon requesting a new file registration, the client process (as run on the user computer 1) clears LSBs after having stored a copy thereof, locally, and obtains a fingerprint. The payload sequence is then generated and subsequently embedded. The basis palindrome is further written to the metadata/headers. There, the client process may request the user to configure options for future verifications (such as encoding options). The user is further requested to commit, which eventually causes to remotely store the substituted LSBs, as well as the digital fingerprint (or the palindrome), and other file metadata.

2.3 Computer Devices and Computer Programs

Computerized devices can be suitably designed for implementing embodiments of the present invention as described herein. In that respect, it can be appreciated that the methods described herein are at least partly non-interactive, i.e., automated. Automated parts of such methods can be implemented in software, hardware, or a combination thereof. In exemplary embodiments, automated parts of the methods described herein are implemented in software, as a service or an executable program (e.g., an application), the latter executed by suitable digital processing devices.

For instance, as depicted in FIG. 6, a typical computerized unit 200 may include a processor 230 and a memory 250 (possibly including several memory units) coupled to one or memory controllers 240. The processor 230 is a hardware device for executing software, as e.g., loaded in a main memory of the device. The processor, which may in fact comprise one or more processing units, can be any custom made or commercially available processor.

The memory typically includes a combination of volatile memory elements (e.g., random access memory) and non-volatile memory elements, e.g., a solid-state device. The software in memory may include one or more separate programs, each of which comprises an ordered listing of executable instructions for implementing logical functions. In the example of FIG. 6, the software in the memory includes computerized methods described herein in accordance with exemplary embodiments and a suitable operating system (OS). The OS essentially controls the execution of other computer (application) programs and provides scheduling, input-output control, file and data management, memory management, and communication control and related services. It may further control the distribution of tasks to be performed by the processing units 230.

The methods described herein shall typically be in the form of executable program, script, or, more generally, any form of executable instructions.

The computerized unit 200 can further include a display controller 282 coupled to a display 284. In exemplary embodiments, the computerized unit 200 further includes a network interface 290 or transceiver for coupling to a network (not shown), through which it may connect to other units 200, such as units forming part of the systems 1-3 shown in FIGS. 1A and 1B. In addition, the computerized unit 200 will typically include one or more input and/or output (I/O) devices 210, 220 (or peripherals) that are communicatively coupled via a local input/output controller 260. A system bus 270 allows all components to be interfaced. Further, the local interface may include address, control, and/or data connections to enable appropriate communications among the aforementioned components. The I/O controller 260 may have additional elements, which are omitted for simplicity, such as controllers, buffers (caches), drivers, repeaters, and receivers, to allow data communication.

When the computerized unit 200 is in operation, one or more processing units 230 executes software loaded in the memory of the computerized unit 200, to communicate data to and from the memory 250 and/or the storage unit 255 (e.g., a hard drive and/or a solid-state memory), and to generally control operations pursuant to software instructions. The methods described herein and the OS, in whole or in part are accessed by the processing elements, typically buffered therein, and then executed. When the methods described herein are implemented in software, the methods can be stored on any computer readable medium for use by or in connection with any computer related system or method.

Computer readable program instructions described herein can be downloaded to processing elements from a computer readable storage medium, via a network, for example, the Internet and/or a wireless network. A network adapter card or network interface 290 may receive computer readable program instructions from the network and forwards such instructions for storage in a computer readable storage medium 255 interfaced with the processing means 230.

Aspects of the present invention are described herein notably with reference to a flowchart and a block diagram. It will be understood that each block, or combinations of blocks, of the flowchart and the block diagram can be implemented by computer readable program instructions.

These computer readable program instructions may be provided to one or more processing elements 230 as described above, to produce a machine, such that the instructions, which execute via the one or more processing elements create means for implementing the functions or acts specified in the block or blocks of the flowchart and the block diagram. These computer readable program instructions may also be stored in a computer readable storage medium.

The flowchart and the block diagram in the accompanying drawings illustrate the architecture, functionality, and operation of possible implementations of the computerized unit 200, methods of operating it, and computer program products according to various embodiments of the present invention. Note that each computer-implemented block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently, or in a reverse order, depending on the functions involved and the algorithm optimization retained. It is also reminded that each block and combinations thereof can be adequately distributed among special purpose hardware components.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant, or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other types of signature and hashing algorithms may be used.

The invention claimed is:

1. A computer-implemented method of processing a data file, wherein the method comprises:
accessing a data file containing binary data that represent analogue data, to populate a first data structure with the binary data;
obtaining a second data structure by replacing, in the first data structure, data corresponding to some of least significant bits of the binary data with substitutive bit values;
obtaining a digital fingerprint of the second data structure;
forming a binary representation of a payload, wherein the payload includes repeats of a sequence containing a palindrome based on the digital fingerprint;
obtaining a third data structure by embedding the binary representation of the payload formed in the second data structure, in place of the substitutive bit values; and
storing a modified data file including binary data of the third data structure.

2. The method according to claim 1, wherein,
at forming the binary representation of the payload, the sequence further includes an asymmetric delimiter, wherein the latter is adjoined to the palindrome in the sequence.

3. The method according to claim 1, wherein
each of the first data structure, the second data structure, and the third data structure, is representable as a 2D matrix of binary data, the 2D matrix including columns and rows, whereby a subset of the rows of the second data structure include the substitutive bit values; and
the binary representation of the payload is embedded by orthogonally interspersing bit values of the binary representation through said subset of the rows, such that two consecutive bit values in each row of said subset of the rows correspond to an element of an embedded column of the binary representation and an element of an embedded row of the binary representation.

4. The method according to claim 3, wherein
the first data structure is dimensioned according to an expected bit length of the sequence, whereby a length of each of the rows of the first data structure corresponds to twice the expected bit length of the sequence.

5. The method according to claim 1, wherein:
the binary data contained in the accessed data file are encoded in a first number of bits; and
forming the binary representation of the payload comprises encoding the sequence in a second number of bits, wherein the second number differs from the first number.

6. The method according to claim 5, wherein the method further comprises, prior to encoding the sequence:
accessing a parameter as to the second number of bits; and
accordingly setting the second number of bits.

7. The method according to claim 1, wherein
the method is performed by running an algorithm on a user computer, preferably on a web browser of the user computer.

8. The method according to claim 1, wherein the method further comprises
adding the palindrome in each of one or more headers of the modified data file, the palindrome being preferably added in one or more of:
an author section of a metadata header;
a comment section of the metadata header; and
a data block header.

9. The method according to claim 1, wherein
the digital fingerprint is obtained by hashing input data obtained from the second data structure, preferably as part of cryptographically signing this input data.

10. The method according to claim 1, wherein the method further comprises:
accessing a further data file containing binary data that represents analogue data;
scanning through a representation of the binary data of the further data file to detect the sequence as part of the payload, a binary representation of which is embedded in the binary data of the further data file, the sequence containing said palindrome; and
comparing the palindrome of the detected sequence with a reference palindrome to identify a correspondence between said further data file and the modified data file.

11. The method according to claim 10, wherein:
the sequence includes an initial asymmetric delimiter adjoined to the palindrome;
the detected sequence includes an altered version of the initial asymmetric delimiter; and
the method further comprises comparing the altered version of the initial asymmetric delimiter with the initial asymmetric delimiter to determine a type of alteration of the further data file with respect to the modified data file.

12. The method according to claim 10, wherein the method further comprises:
extracting the palindrome from a header and/or metadata of the further data file accessed; and
comparing the palindrome contained in the detected sequence with the extracted palindrome.

13. The method according to claim 1, wherein
the digital fingerprint is obtained as part of cryptographically signing data obtained from the second data structure, using a private cryptographic key; and
the method further comprises verifying the digital fingerprint corresponding to the detected palindrome, thanks to a public key corresponding to said private key.

14. The method according to claim 1, wherein accessing the data file comprises:
opening an initial data file containing initial binary data that do not represent any analogue data;
adding an image to the initial data file to obtain said data file, whereby the latter contains binary data that represents analogue data corresponding to the added image; and
identifying the binary data that correspond to the added image.

15. The method according to claim 1, wherein accessing the data file comprises:
opening the data file;
detecting an image included in the data file; and
identifying the binary data contained in this data file that correspond to the detected image.

16. A method of verifying a correspondence between data files, wherein the method comprises:
accessing a data file containing binary data that represents analogue data;
scanning through a representation of the binary data of the accessed data file to detect a sequence in a binary representation of a payload embedded in the binary data, wherein
the payload includes repeats of the sequence,
the sequence contains a palindrome that is based on a digital fingerprint of a variant of the accessed data file, and
said variant contains substitutive bit values in place of the embedded binary representation; and
comparing the palindrome contained in the detected sequence to a reference palindrome corresponding to reference data file, to identify a correspondence between the accessed data file and the reference data file.

17. A data file, comprising:
binary data that represent analogue data, and
a binary representation of a payload embedded in the data file, in place of some least significant bits of the binary data,
wherein
the payload includes repeats of a sequence, and
the sequence contains a palindrome that is based on a digital fingerprint of a variant to said data file, said variant containing substitutive bit values in place of the embedded binary representation.

18. A computer program product for processing a data file, the computer program product comprising a non-transitory computer readable storage medium having program instructions embodied therewith, the program instructions executable by processing means of a computerized system to cause the processing means to:
access a data file containing binary data that represent analogue data, to populate a first data structure with the binary data;
obtain a second data structure by replacing, in the first data structure, data corresponding to some of least significant bits of the binary data with substitutive bit values;
obtain a digital fingerprint of the second data structure;
form a binary representation of a payload, wherein the payload includes repeats of a sequence containing a palindrome based on the digital fingerprint;
obtain a third data structure by embedding the binary representation of the payload formed in the second data structure, in place of the substitutive bit values; and
store a modified data file including binary data of the third data structure.

19. A computerized system, wherein the system comprises a main memory; and
processing means connected to the main memory,
wherein
the computerized system is configured to load computerized methods in the main memory, for the processing means to execute the loaded computerized methods and thereby cause to:
access a data file containing binary data that represent analogue data, to populate a first data structure with the binary data;
obtain a second data structure by replacing, in the first data structure, data corresponding to some of least significant bits of the binary data with substitutive bit values;
obtain a digital fingerprint of the second data structure;
form a binary representation of a payload, wherein the payload includes repeats of a sequence containing a palindrome based on the digital fingerprint;
obtain a third data structure by embedding the binary representation of the payload formed in the second data structure, in place of the substitutive bit values; and
store a modified data file including binary data of the third data structure.

20. The computerized system according to claim 19, wherein
the computerized system is further configured to run a web browser via the processing means, for the loaded computerized methods to execute as part of the web browser run on the computerized system, in operation.

* * * * *